US008244316B2

(12) United States Patent
Lu

(10) Patent No.: US 8,244,316 B2
(45) Date of Patent: Aug. 14, 2012

(54) ELECTRONIC DEVICE

(75) Inventor: Pen-Uei Lu, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 669 days.

(21) Appl. No.: 12/346,820

(22) Filed: Dec. 30, 2008

(65) Prior Publication Data

US 2010/0048258 A1    Feb. 25, 2010

(30) Foreign Application Priority Data

Aug. 22, 2008   (CN) .......................... 2008 1 0304157

(51) Int. Cl.
*H04M 1/00* (2006.01)
(52) U.S. Cl. .................................... 455/575.1
(58) Field of Classification Search ............... 455/550.1, 455/575.1
See application file for complete search history.

(56) References Cited

U.S. PATENT DOCUMENTS

| 6,842,332 B1 | 1/2005 | Rubenson et al. |
| 2005/0153753 A1* | 7/2005 | Cheng ........................ 455/575.3 |

FOREIGN PATENT DOCUMENTS

| CN | 2620884 Y | 6/2004 |
| CN | 1655467 A | 8/2005 |
| TW | I264931 | 10/2006 |

* cited by examiner

*Primary Examiner* — Lincoln Donovan
*Assistant Examiner* — Daniel Rojas
(74) *Attorney, Agent, or Firm* — Altis Law Group, Inc.

(57) ABSTRACT

An electronic device includes a main body, a keyboard, a first magnet, and a second magnet. The first magnet is positioned on the main body. The second magnet is positioned on the keyboard. The main body defines a receiving cavity configured for receiving the keyboard. A sidewall of the receiving cavity defines a cut-out adjacent to the board. The keyboard is capable of being taken out of the receiving cavity by an external force exerting on a portion of the keyboard adjacent to the cut-out.

9 Claims, 4 Drawing Sheets

ELECTRONIC DEVICE

BACKGROUND

1. Technical Field

The present disclosure relates to an electronic device and, more particularly, to an electronic device with a detachable keyboard.

2. Description of the Related Art

Electronic devices, such as mobile phones, notebook computers, and personal digital assistants, are widely used. These electronic devices generally have keyboards.

A typical electronic device includes a main body, a keyboard positioned on the main body, a first magnet positioned on the main body, and a second magnet positioned on the keyboard. The first magnet includes a north polarity and a south polarity. The second magnet includes a north polarity and a south polarity. In addition, an active member is positioned on the keyboard to control a movement of the second magnet, thereby adjusting a position of the second magnet relative to the first magnet.

The second magnet is adjusted such that the north polarity of the second magnet faces the south polarity of the first magnet, thereby fixing the keyboard on the main body by an attractive force created between the first and second magnets.

To detach the keyboard from the main body, the second magnet is adjusted such that the south polarity of the second magnet faces the south polarity of the first magnet, thereby creating a repelling force.

In the typical electronic device, the active member is a complicated structure. In addition, a receiving cavity needs to be defined in the electronic device to receive the active member, thereby increasing a volume of the electronic device.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION OF THE EMBODIMENTS

The electronic device of the disclosure may be a cell phone, a notebook computer, or a PDA. Hereinafter, for the purposes of conveniently describing the electronic device, embodiments of a cell phone is described and illustrated.

Figure 1:
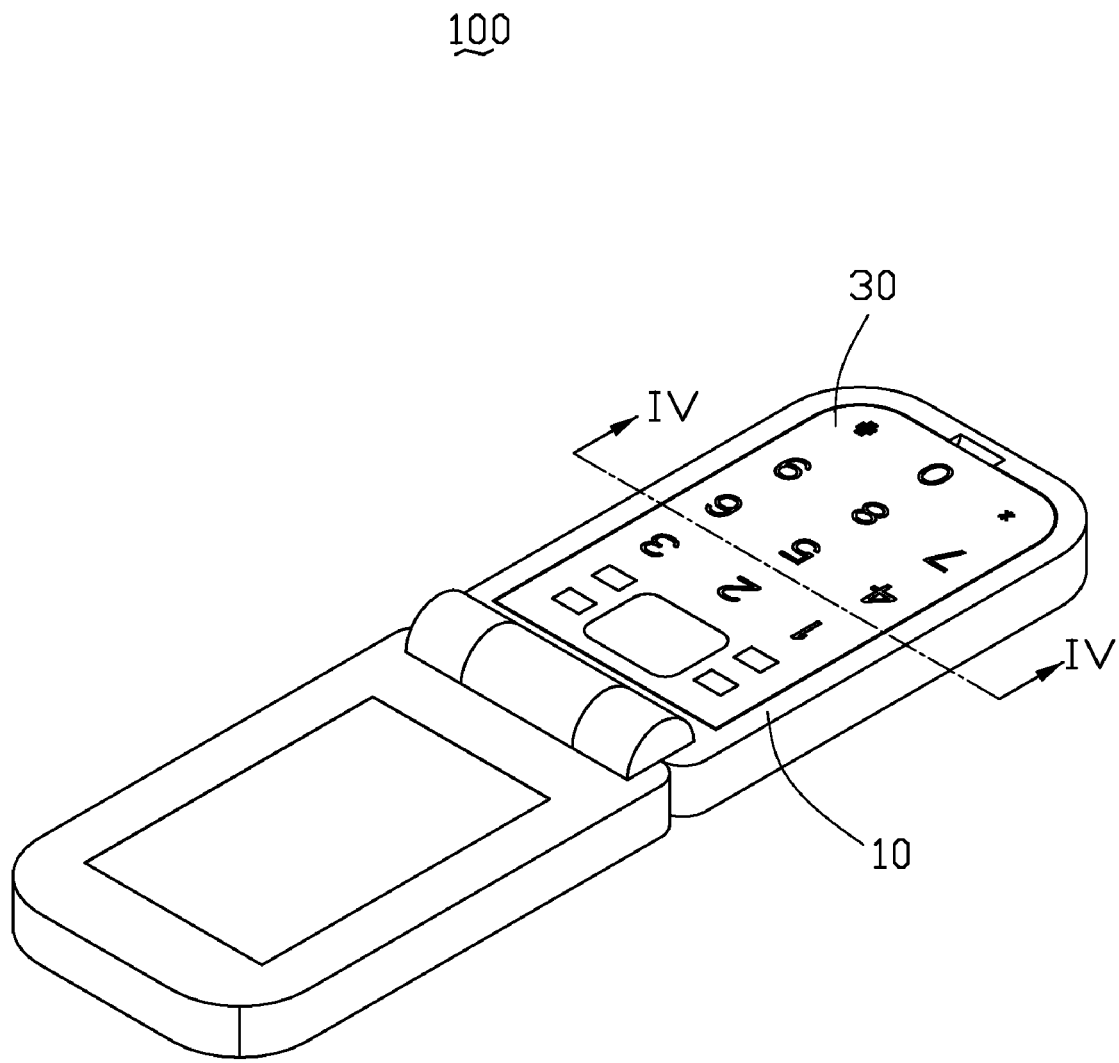
FIG. 1 is an isometric view of an embodiment of an electronic device.
Figure 2:
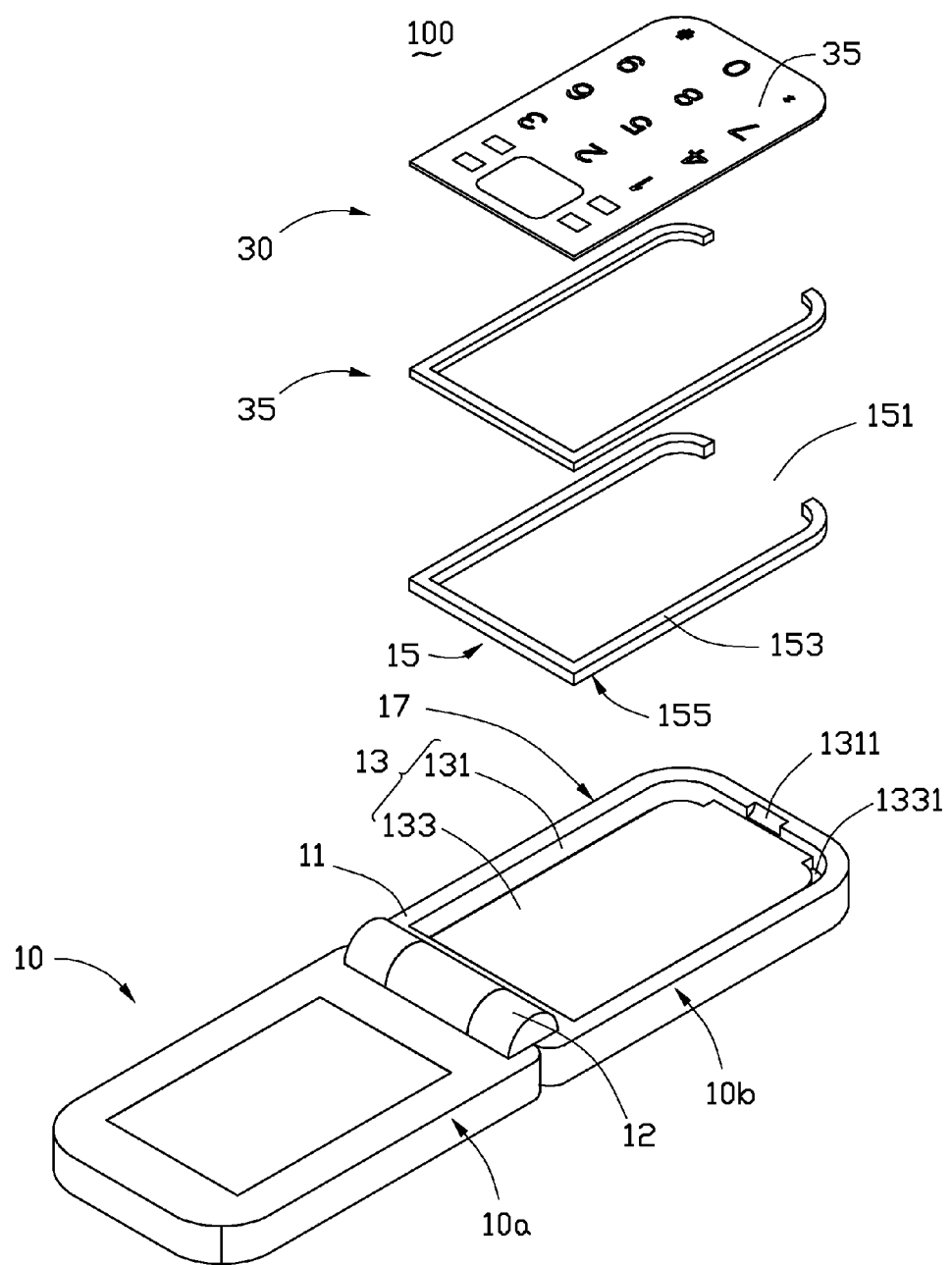
FIG. 2 is a partially exploded view of the electronic device in FIG. 1.

Referring to FIGS. 1 and 2, a cell phone 100 includes a main body 10, a keyboard 30 positioned on the main body 10, a first magnet 15, and a second magnet 35.

The main body 10 comprises a first body 10a and a second body 10b. The first body 10a and the second body 10b are connected by a hinge 12. The second body 10b of the main body 10 includes a receiving surface 11 and a side surface 17 connecting the receiving surface 11. The receiving surface 11 defines a receiving cavity 13 to receive the keyboard 30

The receiving cavity 13 is cooperatively defined by a base 133 and a sidewall 131 extending from the base 133. The sidewall 131 defines a cut-out 1311. The cut-out 1311 communicates with the receiving surface 11. Alternatively, the cut-out 1311 may communicate with the side surface 17. A periphery of the base 133 defines a receiving groove 1331 and a first limiting portion (not labeled). The receiving groove 1331 may be substantially rectangular.

The first magnet 15 includes a first surface 153 and a second surface 155 opposite to the first surface 153. The first magnet 15 defines a first opening 151 such that a shape of the first magnet 15 corresponds to a shape of the receiving groove 1331, so that the first magnet 15 can be inserted into the receiving groove 1331 with the first limiting portion inserted into the first opening 151.

After the first magnet 15 is inserted into the receiving groove 1331, the first opening 151 is substantially aligned with the cut-out 1311, and the first surface 153 is aligned with the base 133. The first magnet 15 may be fixed in the receiving groove 1331 by means of latching, adhesive, and so on. In the illustrated embodiment, the first magnet 15 is fixed on in the receiving groove 1331 by an adhesive means.

Figure 3:
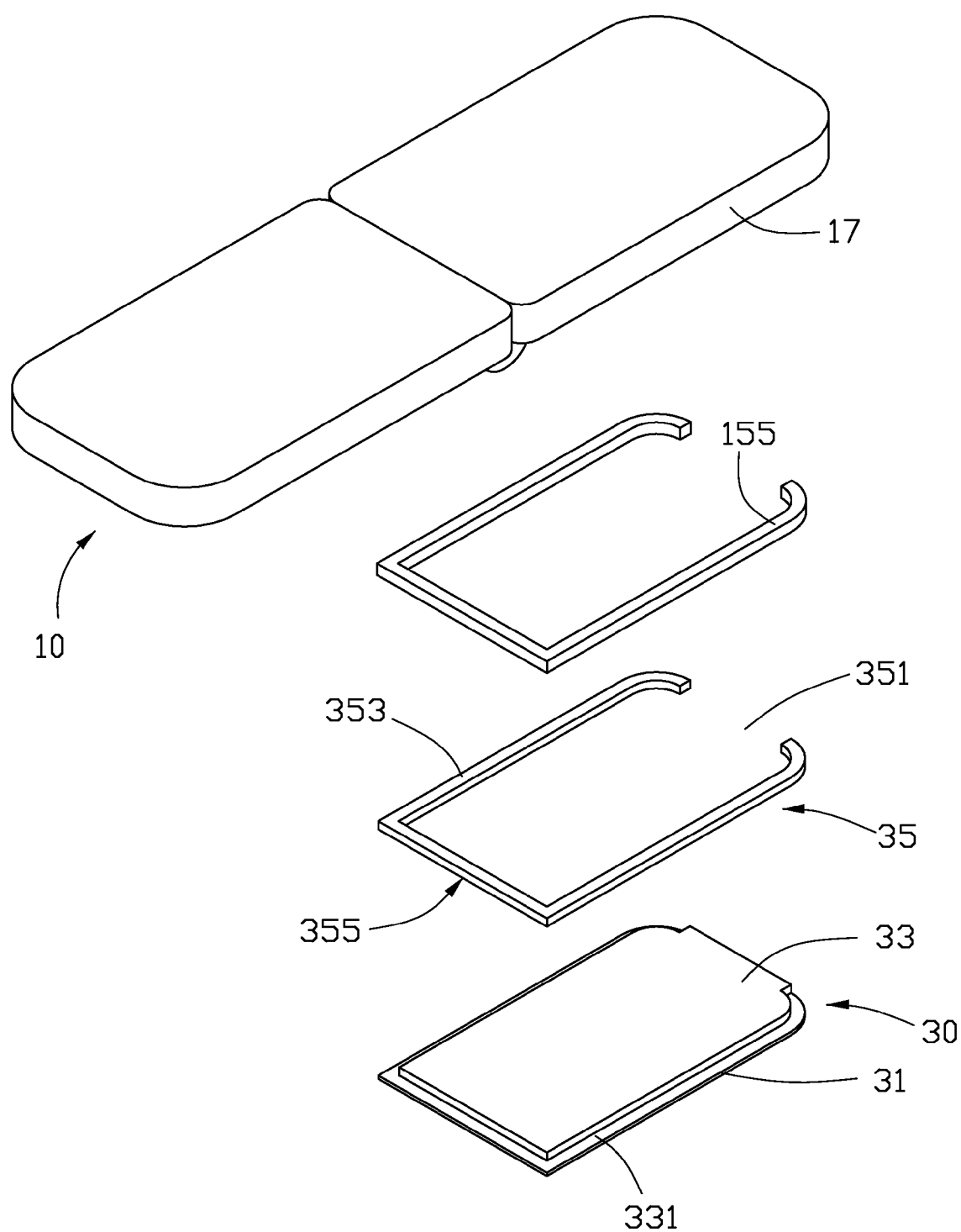
FIG. 3 is similar to FIG. 2, but from another aspect.

Referring also to FIG. 3, the keyboard 30 includes a side surface 31, a bottom surface 33, and an operating surface 35 opposite to the bottom surface 33. A periphery of the bottom surface 33 defines a receiving depression 331 to receive the second magnet 35 and a second limiting portion. The receiving depression 331 may be substantially rectangular. A plurality of keys are set on the operating surface 35.

The second magnet 35 includes a first surface 353 and a second surface 355 opposite to the first surface 353. The second magnet 35 defines a second opening 351 such that a shape of the second magnet 35 corresponds to a shape of the receiving depression 331. Thus, the second magnet 35 may be embedded in the receiving depression 331 with the limiting portion of the keyboard 30 inserted into the second opening 351. After the keyboard 30 is fixed in the receiving cavity 13, the second opening 351 is substantially aligned with the first opening 151, and the first opening 151 and the second opening 351 are adjacent to the cut-out 1311. The first surface 353 of the second magnet 35 is substantially coplanar with the second bottom surface 33. It can be understood that, the second magnet 35 may be latched in the receiving depression 331.

Figure 4:
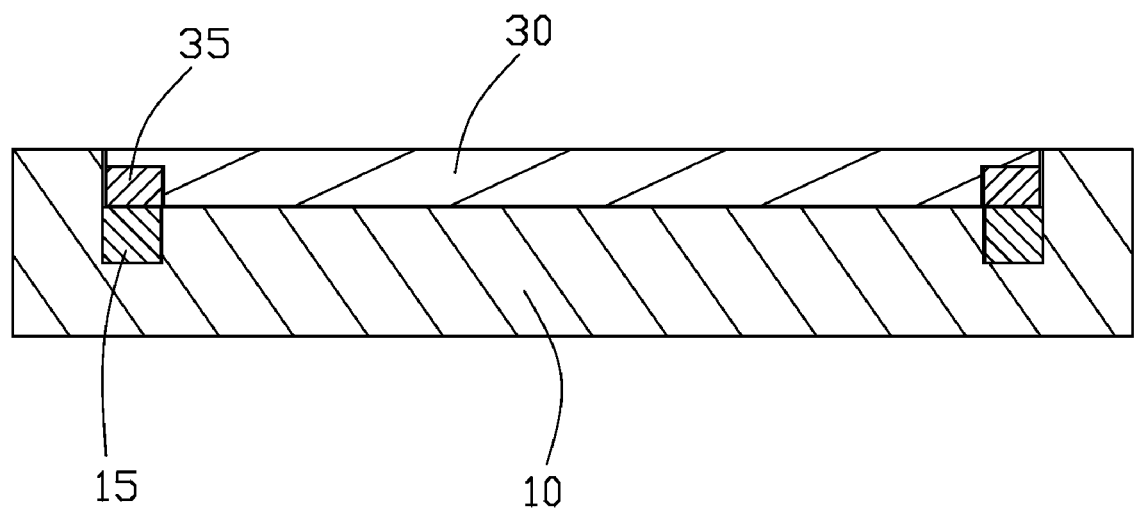
FIG. 4 is a cross-sectional view taken along the line IV-IV of FIG. 1.

Also referring to FIG. 4, the first surface 153 of the first magnet 15 and the second surface 355 of the second magnet 35 have a first polarity, such as a north polarity, and the second surface 155 of first magnet 15 and the first surface 353 of the second magnet 35 have a second polarity opposite to the first polarity, such as a south polarity. There is no magnetic material in the first opening 151 of the first magnet 15 and the second opening 351 of the second magnet 35. The attractive force between a portion adjacent to the first opening 151 and a portion adjacent to the second opening 351 is relatively weak.

The keyboard 30 may be fixed to the main body 10 by a magnetic attractive force created between the north polarity of first magnet 15 and the south polarity of the second magnet 35. When the keyboard 30 is received in the receiving cavity 13, the operating surface of the keyboard 30 is substantially coplanar with the receiving surface 11. In addition, the sidewall 131 resists the keyboard 30 and prevents the keyboard 30 from moving relative to the main body 10 along a direction substantially perpendicular to the sidewall 131.

To detach the keyboard 30 from the main body 10, an object, such as one's finger, is able to pass through the cut-out 1311 and exert an external force on a portion of the keyboard 30 adjacent to the cut-out 1311 such that the keyboard 30 is taken out of the receiving cavity 13. In other words, the cut-out 1311 of the main body 10 facilitates a detachment of the keyboard 30 from the main body 10. In addition, since the first opening 151 and the second opening 351 are adjacent to the cut-out 1311, the magnetic attractive force is relatively weak, so a relatively small force is sufficient to detach the keyboard 30 from the main body 10.

In the illustrated embodiment, the first magnet 15 and the second magnet 35 may be made of any magnetic materials. The receiving groove 1331 and the receiving depression 331 are substantially rectangular, the shape of the first magnet 15 corresponds to the shape of the receiving groove 1331, and the shape of the second magnet 35 corresponds to the shape of the receiving depression 331, so that the first magnet 15 and the second magnet 35 are easily fixed in the receiving groove 1331 and the receiving depression 331. It can be understood that, a shape of the first magnet 15 and the second magnet 35 may be other shapes such as circular shaped.

While various embodiments have been described and illustrated, the embodiments are not to be construed as being limited thereto. Various modifications can be made to the embodiments by those skilled in the art without departing from the true spirit and scope of the present disclosure as defined by the appended claims.

What is claimed is:

1. An electronic device, comprising:
   a main body comprising a receiving surface, the receiving surface defining a receiving cavity;
   a keyboard positioned in the receiving cavity, the keyboard having an operating surface with a plurality of keys formed thereon;
   a first magnet positioned in the receiving cavity; and
   a second magnet positioned on the keyboard, wherein the keyboard is received in the receiving cavity, the operating surface of the keyboard is coplanar with the receiving surface of the main body; a sidewall of the receiving cavity defines a cut-out adjacent to the keyboard; the keyboard is capable of being taken out of the receiving cavity by an external force exerting on a portion of the keyboard adjacent to the cut-out; the first magnet is positioned in the receiving cavity, and the first magnet defines a first opening; the second magnet is positioned on the keyboard, and the second magnet defines a second opening; the first opening is substantially aligned with the second opening; the first opening and the second opening are adjacent to the cut-out after the keyboard is fixed to the main body.

2. The electronic device as claimed in claim 1, wherein a base of the receiving cavity defines a receiving groove to receive the first magnet and a first limiting portion.

3. The electronic device as claimed in claim 2, wherein the receiving groove is substantially rectangular; the first magnet is embedded in the receiving groove with the limiting portion of the main body inserted into the first opening.

4. The electronic device as claimed in claim 3, wherein the first magnet is aligned with the base of the receiving cavity after the first magnet is embedded in the receiving groove.

5. The electronic device as claimed in claim 1, wherein when the keyboard comprises a bottom surface, the bottom surface defines a receiving depression to receive the second magnet and a second limiting portion.

6. The electronic device as claimed in claim 5, wherein the receiving depression is defined in a periphery of the bottom surface of the keyboard;
   the receiving depression is substantially rectangular; the second magnet is embedded in the receiving depression with the limiting portion of the keyboard inserted into the second opening.

7. The electronic device as claimed in claim 6, wherein the second magnet is aligned with the bottom surface of the keyboard after the second magnet is fixed in the receiving depression.

8. The electronic device as claimed in claim 1, wherein the sidewall of the receiving cavity resists the keyboard.

9. An electronic device, comprising:
   a main body comprising a first body, a second body and a hinge connecting the first and second bodies, the second body comprising a receiving surface, the receiving surface defining a receiving cavity;
   a keyboard positioned in the receiving cavity, the keyboard having an operating surface with a plurality of keys formed thereon;
   a first magnet positioned in the receiving cavity; and
   a second magnet positioned on the keyboard, wherein the keyboard is received in the receiving cavity, the operating surface of the keyboard is coplanar with the receiving surface of the second body; a sidewall of the receiving cavity defines a cut-out adjacent to the keyboard; the keyboard is capable of being taken out of the receiving cavity by an external force exerting on a portion of the keyboard adjacent to the cut-out; the first magnet is positioned in the receiving cavity, and the first magnet defines a first opening; the second magnet is positioned on the keyboard, and the second magnet defines a second opening; the first opening is substantially aligned with the second opening; the first opening and the second opening are adjacent to the cut-out after the keyboard is fixed to the main body.

* * * * *